United States Patent
Chen et al.

(10) Patent No.: US 10,162,215 B2
(45) Date of Patent: Dec. 25, 2018

(54) AUTOMATIC BACKLIGHT CONTROL SYSTEM AND METHOD THEREOF

(71) Applicant: Chung Yuan Christian University, Chung Li (TW)

(72) Inventors: Shih-Lun Chen, Chung Li (TW); Ting-Lan Lin, Chung Li (TW); Kun-Hsien Tung, Chung Li (TW); Ying Chen, Chung Li (TW)

(73) Assignee: CHUNG YUAN CHRISTIAN UNIVERSITY, Chung Li (TW)

( * ) Notice: Subject to any disclaimer, the term of this patent is extended or adjusted under 35 U.S.C. 154(b) by 0 days.

(21) Appl. No.: 15/815,045

(22) Filed: Nov. 16, 2017

(65) Prior Publication Data

US 2018/0307098 A1 Oct. 25, 2018

(30) Foreign Application Priority Data

Apr. 19, 2017 (TW) .............................. 106113105 A (51) Int. Cl.
*G02F 1/00* (2006.01)
*G09G 3/00* (2006.01)
*G02F 1/1335* (2006.01)
*G09G 3/34* (2006.01)
*G09G 3/06* (2006.01)

(52) U.S. Cl.
CPC ......... *G02F 1/133602* (2013.01); *G09G 3/06* (2013.01); *G09G 3/3406* (2013.01); *G09G 2320/0626* (2013.01)

(58) Field of Classification Search
CPC ............ G09G 2320/0626; G09G 3/06; G09G 3/3406; G02F 1/133602
See application file for complete search history.

(56) References Cited

U.S. PATENT DOCUMENTS

| | | | | |
|---|---|---|---|---|
| 9,336,728 | B2 * | 5/2016 | Neal | G09G 3/3426 |
| 2014/0368558 | A1 * | 12/2014 | Ikeda | G09G 3/3426 |
| | | | | 345/690 |
| 2016/0111047 | A1 * | 4/2016 | Yamato | G09G 3/3406 |
| | | | | 345/102 |

* cited by examiner

*Primary Examiner* — Muhammad N Edun
(74) *Attorney, Agent, or Firm* — Muncy, Geissler, Olds & Lowe, P.C.

(57) ABSTRACT

An automatic backlight control system and a method thereof, for receiving and analyzing an image dataset to control the backlight module of a display device are provided. Firstly, a first backlight intensity value generated by using the analysis and control module to analyze a first frame data is stored in the storage module. Then, the analysis and control module generates a translation vector value according to a first vector component and a second vector component of an equivalent translation vector corresponding to a second frame data of the image dataset. When the translation vector value is smaller than the threshold value, the selection module transmits the first backlight intensity value to the backlight control module for controlling the backlight module according to first backlight intensity value. When the translation vector value is greater than the threshold value, the backlight control module controls the backlight module according to the second backlight intensity value.

10 Claims, 5 Drawing Sheets

AUTOMATIC BACKLIGHT CONTROL SYSTEM AND METHOD THEREOF

BACKGROUND OF INVENTION

1. Field of the Invention

The present invention is related to an automatic backlight control system and a method thereof, and more particularly is related to an automatic backlight control system which determines the intensity of the backlight according to the translation vector and the threshold value and a method thereof.

2. Description of the Prior Art

Attending with the progress of technology, the development of electronic devices enhances the standard of living. Among the various electronic devices, the growth of consumer electronics plays an indispensable role. Most of the electronic devices, such as the smartphone, the tablet, the notebook, or the smart TV, are equipped with a display device such as a liquid crystal display (LCD), which is usually the component with higher power consumption in the electronic device.

Concretely speaking, the conventional backlight control technology calculates the value of backlight intensity from frame to frame or region to region when the frames are displayed on the display device. When the consecutive video frames with the frame rate of 30 to 60 frames per second are displayed, the repeated calculation of backlight intensity would be too complicated, such that the problems of frame delay, high power consumption and cost would be raised.

SUMMARY OF THE INVENTION

For the conventional backlight control technology, it is needed to calculate backlight intensity for each of the frames. Therefore, it is common to have the problems of complex calculation, frame delay, high power consumption and high cost. Therefore, an automatic backlight control system and a method thereof is provided in the present invention, which uses the quantity of the translation vector and the threshold value to decide the backlight intensity value to be outputted, such that the objects of simplifying the complex calculation and reducing the power consumption can be achieved.

Accordingly, an automatic backlight control system is provided in accordance with a main object of the present invention. The automatic backlight control system is utilized for receiving an image dataset to control a backlight module of a display device. The automatic backlight control system comprises a storage module, a analysis and control module, a frame analyzing module, a selection module, and a backlight control module. The storage module stores a first backlight intensity value corresponding to a first frame data of the image dataset in advance. The analysis and control module is utilized for receiving an equivalent translation vector corresponding to a second frame data of the image dataset. The equivalent translation vector includes a first vector component and a second vector component. The analysis and control module is utilized for generating a translation vector value according to the first vector component and the second vector component, transmitting a first control signal when the translation vector value is smaller than a threshold value, and transmitting a second control signal when the translation vector value is greater than the threshold value. The frame analyzing module is electrically connected to the analysis and control module for receiving the second frame data and analyzing the second frame data to generate a second backlight intensity value when receiving the second control signal.

The selection module is electrically connected to the analysis and control module, the storage module, and the frame analyzing module for transmitting the first backlight intensity value stored in the storage module when receiving the first control signal, and for transmitting the second backlight intensity value generated by the frame analyzing module when receiving the second control signal. The backlight control module is electrically connected to the selection module and the backlight module for receiving the first backlight intensity value or the second backlight intensity value to control the backlight module.

In accordance with an embodiment of the automatic backlight control system of the present invention, the automatic backlight control system is electrically connected between a video analyzing device and the display device, and the video analyzing device is utilized for transmitting the image dataset. The video analyzing device is a setup box, a video player, or a display card. In addition, the analysis and control module includes a translation vector processing unit and a control unit. The translation vector processing unit is electrically connected to the video analyzing device and is set with the threshold value for receiving the equivalent translation vector to generate the translation vector value according to the first vector component and the second vector component. The translation vector processing unit would transmit a first selection signal when the translation vector value is smaller than the threshold value, and transmit a second selection signal when the translation vector value is greater than the threshold value. The control unit is electrically connected to the translation vector processing unit for transmitting the first control signal when receiving the first selection signal, and for transmitting the second control signal when receiving the second selection signal.

In accordance with an embodiment of the automatic backlight control system of the present invention, the backlight control module includes a frame processing unit and a backlight control unit. The frame processing unit is electrically connected to the video analyzing device, the selection module, and the display device, for processing the second frame data to generate a processed frame data according to the first backlight intensity value or the second backlight intensity value. The backlight control unit is electrically connected to the selection module and the display device, for transmitting a backlight control signal representing the first backlight intensity value or the second backlight intensity value to have the display device displaying the processed frame data according to the first backlight intensity value or the second backlight intensity value.

In accordance with an embodiment of the automatic backlight control system of the present invention, the selection module transmits the second backlight intensity value to the storage module to replace the first backlight intensity value when receiving the second control signal. In addition, the analysis and control module generates the translation vector value by calculating a sum of absolute values of the first vector component and the second vector component.

In accordance with an embodiment of the automatic backlight control system of the present invention, the analysis and control module generates the translation vector value by calculating a square root of a sum of squares of the first vector component and the second vector component.

An automatic backlight control method is also provided in accordance with the present invention. The automatic backlight control method is applied to the aforementioned automatic backlight control system for receiving an image dataset to control a backlight module of a display device. The automatic backlight control method comprising the following steps (a) to (f). Step (a) is to receive the image dataset and store a first backlight intensity value corresponding to a first frame data of the image dataset by using the storage module. Then, step (b) is to receive an equivalent translation vector corresponding to a second frame data of the image dataset by using the analysis and control module, and the equivalent translation vector includes a first vector component and a second vector component. Afterward, step (c) is to generate a translation vector value according to the first vector component and the second vector component by using the analysis and control module. Thereafter, step (d) is to determine whether the translation vector value is smaller than a threshold value by using the analysis and control module. If the determination of step (d) is yes, step (e) is executed to transmit, by using the selection module, the first backlight intensity value stored in the storage module, and then following step (e), step (f) is executed to receive, by the backlight control module, the first backlight intensity value to control the backlight module accordingly. If the determination of step (d) is no, step (g) is executed to receive and analyze, by using the frame analyzing module, the second frame data to generate a second backlight intensity value of the second image data, and then following step (g), step (h) is executed to transmit, by the selection module, the second backlight intensity value to the backlight control module to have the backlight control module control the backlight module according to the second backlight intensity value.

In accordance with an embodiment of the present invention, in the step (h), the selection module further transmits the second backlight intensity value to the storage module to replace the first backlight intensity value stored in the storage module.

By using the technologies provided in accordance with the automatic backlight control system and the method thereof provided in the present invention, the present backlight intensity value is transmitted when the translation vector value is greater than the threshold value and the backlight intensity value of the previous frame is transmitted when the translation vector value is smaller than the threshold value, thus, it is not necessary to calculate the backlight intensity repeatedly such that the complex calculation can be simplified, the problems of frame delay can be prevented, and the power consumption can be reduced. In addition, because the complex calculation is not necessary, a cheaper computing chip can be used to replace the high-end chip, such that the calculation cost can be reduced.

BRIEF DESCRIPTION OF THE DRAWINGS

The present invention will now be specified with reference to its preferred embodiment illustrated in the drawings, in which.

DESCRIPTION OF THE PREFERRED EMBODIMENT

There are various embodiments of the automatic backlight control system provided in accordance with the present invention, which are not repeated hereby. Only one preferred embodiment is mentioned in the following paragraph as an example.

Figure 1:
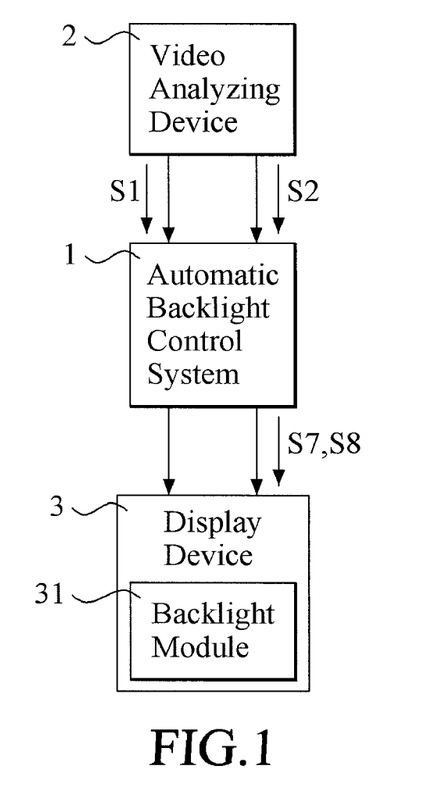
FIG. 1 is a block diagram showing the automatic backlight control system which is electrically connected to a video analyzing device and a display device in accordance with a preferred embodiment of the present invention.
Figure 2:
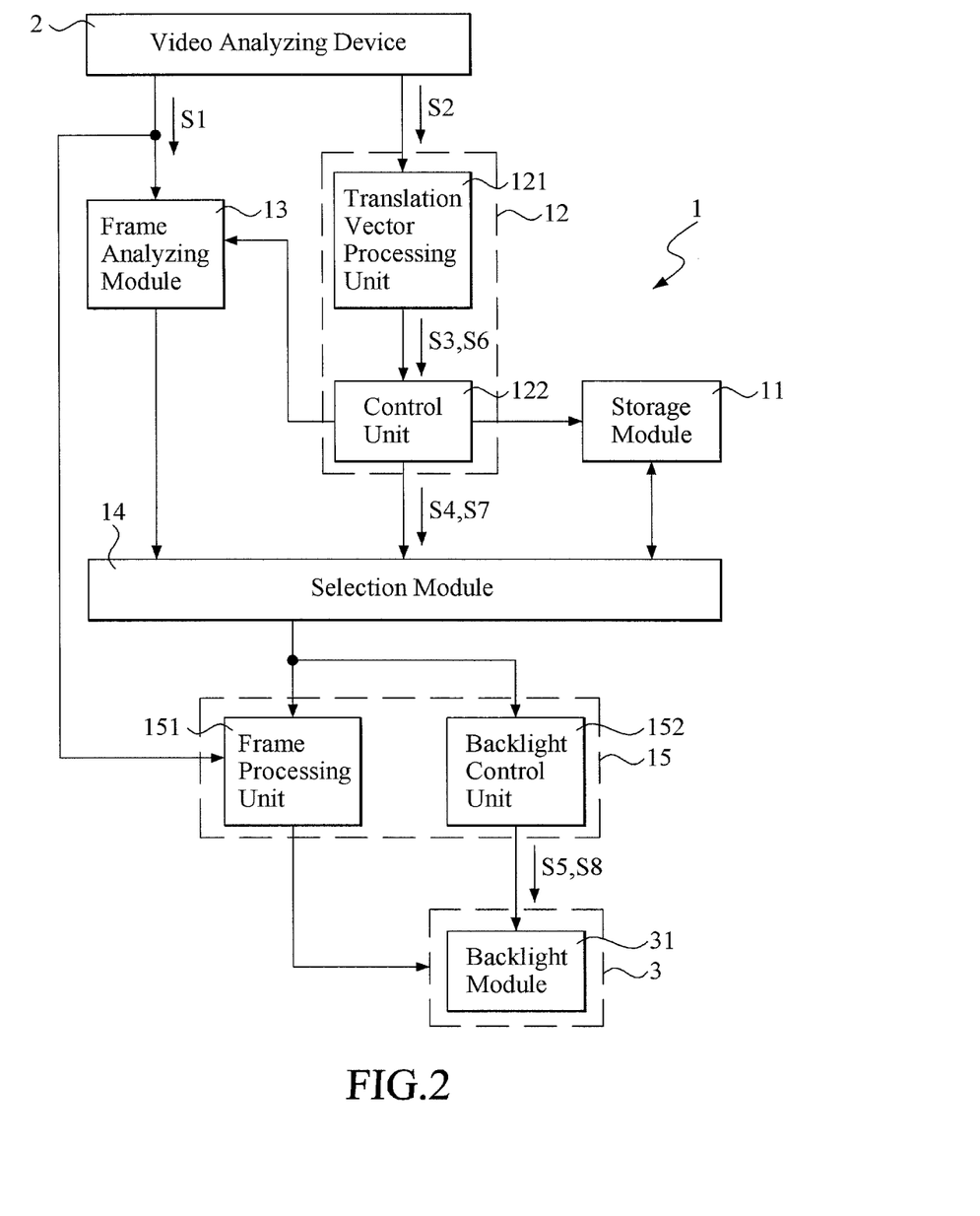
FIG. 2 is a block diagram of the automatic backlight control system in accordance with a preferred embodiment of the present invention.

Please refer to FIG. 1 and FIG. 2, wherein FIG. 1 is a block diagram showing the automatic backlight control system which is electrically connected to a video analyzing device and a display device in accordance with a preferred embodiment of the present invention, and FIG. 2 is a block diagram of the automatic backlight control system in accordance with a preferred embodiment of the present invention.

As shown, the automatic backlight control system 1 provided in accordance with the preferred embodiment of the present invention is electrically connected between a video analyzing device 2 and a display device 3. The automatic backlight control system 1 is utilized for receiving an image dataset to control a backlight module 31 of the display device 3 accordingly.

Concretely speaking, the video analyzing device 2 can be a digital setup box, a video player, a display card, or the other video analyzing device/equipment capable to generate and output the frame data and the translation vector information. In the present embodiment, the video analyzing device 2 transmits the aforementioned image dataset by using an image signal S1. The image dataset in general includes a combination of data of a plurality of frames. When the image dataset is analyzed by the video analyzing device 2, the equivalent translation vectors corresponding to the frame data is also generated, and a vector signal S2 corresponding to the aforementioned equivalent translation vectors is transmitted. In addition, the display device 3 can be a TV, an image display, a liquid crystal display (LCD) panel, or the other displays with the backlight module.

The automatic backlight control system 1 includes a storage module 11, a analysis and control module 12, a frame analyzing module 13, a selection module 14, and a backlight control module 15.

The storage module 11 can be the existed memory, the hard disk drive, or the other storages capable to store information or data. The analysis and control module 12 is electrically connected to the video analyzing device 2. The analysis and control module 12 can be the existed controller with the function to analyze the frame data and transmit a control signal In accordance with a preferred embodiment of the present invention, the analysis and control module 12 includes a translation vector processing unit 121 and a control unit 122. The translation vector processing unit 121 is electrically connected to the video analyzing device 2, and is set with a threshold value. The translation vector processing unit 121 can be the existed processor. In addition, the threshold value can be 15000 for example, but the scope of the present invention should not be restricted thereby. The control unit 122 is electrically connected to the storage module 11 and the translation vector processing unit 121. The control unit 122 can be the existed controller.

The frame analyzing module 13 is electrically connected to the video analyzing device 2 and the control unit 122 of the analysis and control module 12. The frame analyzing module 13 can be the existed analyzer with the ability to analyze the frames. The selection module 14 is electrically connected to the control unit 122 of the analysis and control module 12, the storage module 11 and the frame analyzing module 13. The selection module 14 can be the existed selector.

The backlight control module 15 is electrically connected to the video analyzing device 2, the selection module 14 and the backlight module 31. The backlight control module 15 can be the existed controller. In accordance with a preferred embodiment, the backlight control module 15 includes a frame processing unit 151 and a backlight control unit 152. The frame processing unit 151 is electrically connected to the video analyzing device 2, the selection module 14, and the display device 3. The frame processing unit 151 can be the existed image processor which can processes the frames. The backlight control unit 152 is electrically connected to the selection module 14 and the backlight module 31 of the display device 3. The backlight control unit 152 can be the existed backlight controller capable to control the intensity of backlight.

Figure 3:
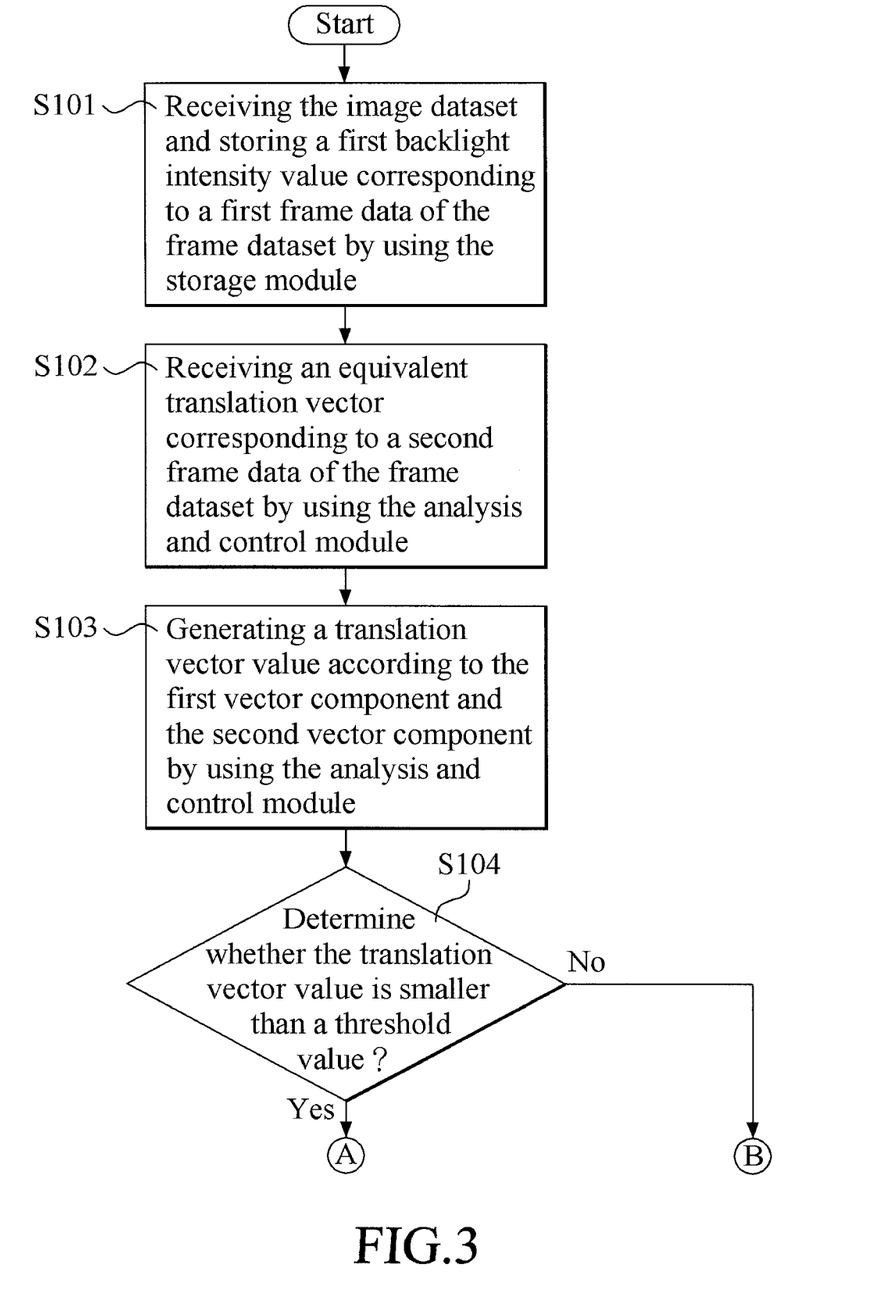
FIGS. 3 and 3A are a flowchart showing the automatic backlight control method in accordance with a preferred embodiment of the present invention.
Figure 3A:
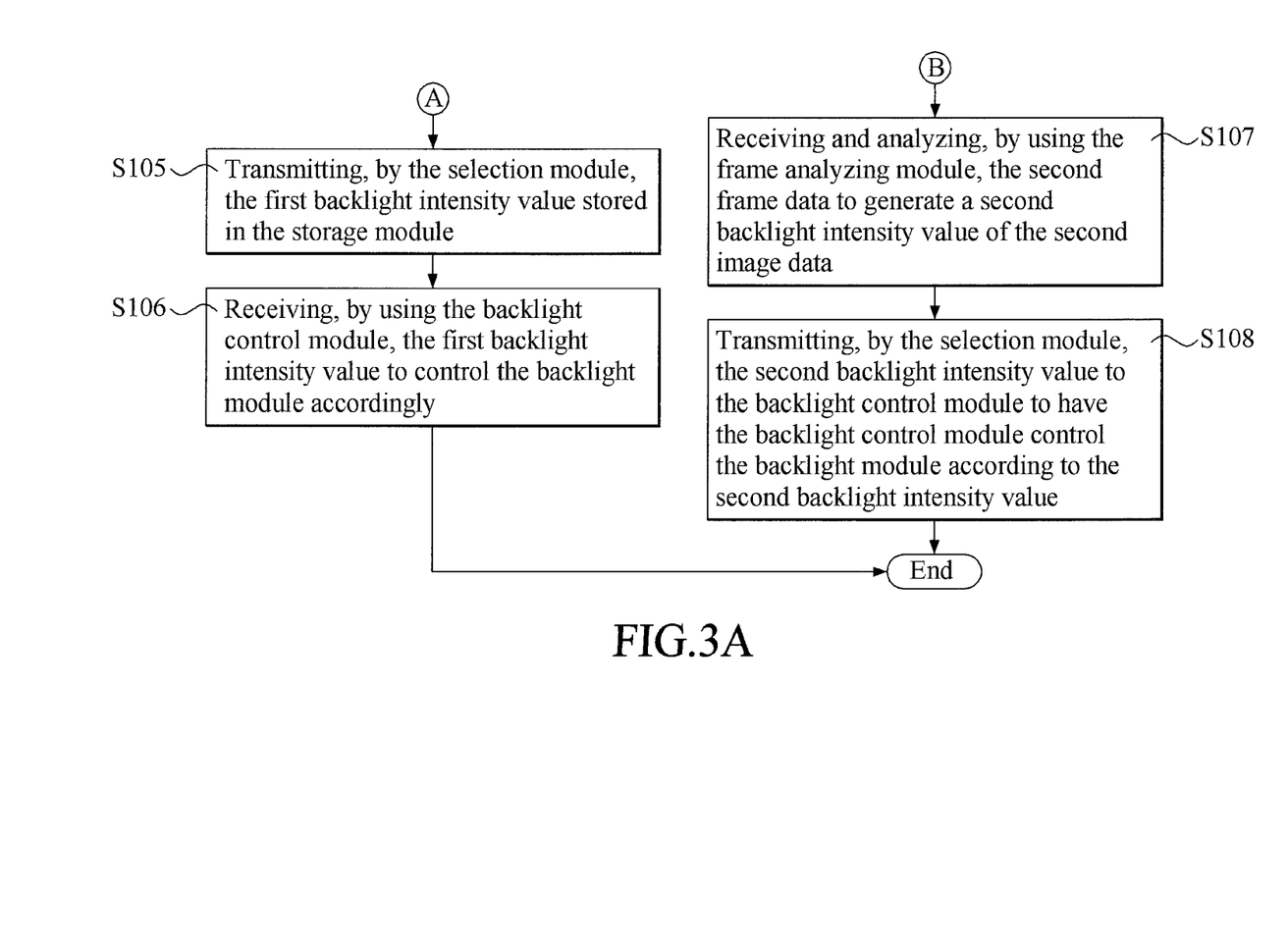

Please refer to FIG. 2 and FIGS. 3 and 3A, wherein FIGS. 3 and 3A are a flowchart showing the automatic backlight control method in accordance with a preferred embodiment of the present invention. As shown, the automatic backlight control method in accordance with the preferred embodiment of the present invention comprises the following steps.

Step S101: receiving the image dataset and storing a first backlight intensity value corresponding to a first frame data of the image dataset by using the storage module 11.

Step S102: receiving an equivalent translation vector corresponding to a second frame data of the image dataset by using the analysis and control module 12.

Step S103: generating a translation vector value according to the first vector component and the second vector component of the equivalent translation vector by using the analysis and control module 12.

Step S104: determining whether the translation vector value is smaller than a threshold value or not.

Step S105: transmitting, by the selection module 14, the first backlight intensity value stored in the storage module 11.

Step S106: receiving, by using the backlight control module 15, the first backlight intensity value to control the backlight module 31 accordingly.

Step S107: receiving and analyzing, by using the frame analyzing module 13, the second frame data to generate a second backlight intensity value of the second frame data.

Step S108: transmitting, by using the selection module 14, the second backlight intensity value to the backlight control module 15 to have the backlight control module 15 control the backlight module 31 according to the second backlight intensity value.

Wherein, in step S101, in the beginning, a first backlight intensity value corresponding to a first frame data of the image dataset is stored in the storage module 11. For example, the first backlight intensity value of the first frame data can be stored in the storage module 11 as the system is started, and the first backlight intensity value is generated by using the frame analyzing module 13 and is transmitted to the storage module 11 through the selection module 14.

In addition, it is worthy to be mentioned that the backlight intensity value in accordance with the preferred embodiment of the present invention can be a ratio to represent a relative intensity or an absolute intensity. Take the relative intensity as an example, the relative intensity is defined as the ratio of a specific intensity to the maximum intensity. However, the scope of the present invention should not be restricted by the exemplary backlight intensity value mentioned above. Those skilled in the art should be able to figure out the other suitable backlight intensity value by using the disclosed conception and specific embodiments of the present invention.

In step S102, the analysis and control module 12 is used to receive the vector signal S2 so as to access the equivalent translation vector corresponding to a second frame data of the image dataset. The equivalent translation vector including a first vector component and a second vector component. For example, the first vector component (labelled as a) is the vector component along the X direction, and the second vector component (labelled as b) is the vector component along the Y direction. However, the scope of the present invention should not be restricted by the exemplary definition of vector components.

In addition, it is worthy to be mentioned that the aforementioned equivalent translation vector represents the equivalent translation vector of at least one region in the second frame data. In practice, the equivalent translation vector can be the sum or the average of the translation vectors of a plurality of regions, or the translation vector of a selected region among the plurality of regions. However, the scope of the present invention should not be restricted thereby. One single region can also be regarded as one frame data, which depends on the need in practice.

In step S103, the analysis and control module 12 is used to generate a translation vector value according to the first vector component and the second vector component. For example, the translation vector value may be generated by calculating a sum of absolute values of the first vector component and the second vector component (i.e. $|a|+|b|$); or generated by calculating a square root of a sum of squares of the first vector component and the second vector component (i.e. $\sqrt{a^2+b^2}$). However, the scope of the present invention should not be restricted thereby.

In step S104, the analysis and control module 12 is used to determine whether the translation vector value is smaller than the threshold value or not. In step S105, if the translation vector processing unit 121 of the analysis and control module 12 determines that the translation vector value is smaller than the threshold value, the translation vector processing unit 121 transmits a first selection signal S3 to the control unit 122, and the control unit 122 of the analysis and control module 12 transmits a first control signal S4 when receiving the first selection signal S3. The selection module 14 transmits the first backlight intensity value stored in the storage module 11 when receiving the first control signal S4.

Moreover, it is worthy to be mentioned that the translation vector value smaller than the threshold value implies that the condition the frame data is static, or close to static; whereas, the translation vector value greater than the threshold value implies the condition that the frame data is moving.

When the control unit 122 transmits the first control signal S4, the storage module 11 also receives the first control signal S4 so as to transmit the first backlight intensity value to the selection module 14, and then the selection module 14 would transmit the first backlight intensity value again. However, the scope of the present invention should not be restricted by the aforementioned process to transmit the first backlight intensity value.

In step S106, the backlight control module 15 receives the first backlight intensity value to control the backlight module 31 accordingly. Concretely speaking, the frame processing unit 151 receives the second frame data of the image signal S1 and the first backlight intensity value transmitted by the selection module 14 so as to process the second frame data to generate a processed frame data according to the first backlight intensity value. The backlight control unit 152 transmits a backlight control signal S5, which represents the first backlight intensity value, to the backlight module 31 to have the display device 3 displaying the processed frame data according to the first backlight intensity value.

In step S107, as the translation vector processing unit 121 of the analysis and control module 12 determines that the translation vector value is greater than the threshold value, the translation vector processing unit 121 transmits a second selection signal S6, the control unit 122 of the analysis and control module 12 transmits a second control signal S7 (only one second control signal S7 is shown in the figure) when receiving the second selection signal S6. When the frame analyzing module 13 receives the second control signal S7 (the control unit 122 also transmits the second control signal S7 to the frame analyzing module 13), the frame analyzing module 13 would receive and analyze the second frame data of the image signal S1 to generate the second backlight intensity value of the second frame data (transmitted to the selection module 14).

In step S108, when the selection module 14 receives the second control signal S7, the second backlight intensity value would be transmitted to the backlight control module 15 to have the backlight control module 15 control the backlight module 31 according to the second backlight intensity value.

Similarly, the frame processing unit 151 receives the second frame data of the image signal S1 and the second backlight intensity value transmitted by the selection module 14 so as to process the second frame data to generate another processed frame data according to the second backlight intensity value. The backlight control unit 152 transmits a backlight control signal S8, which represents the second backlight intensity value, to the backlight module 31 to have the display device 3 displaying the aforementioned another processed frame data according to the second backlight intensity value.

In addition, in step S108, when the selection module 14 receives the second control signal S7, the selection module 14 is triggered to transmit the second backlight intensity value to the storage module 11 to replace the first backlight intensity value originally stored in the storage module 11.

Figure 4:
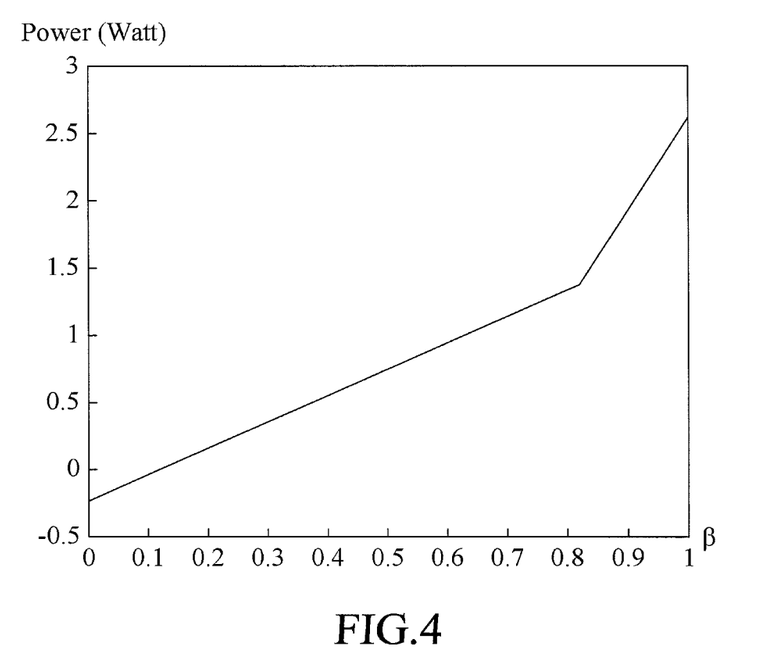
FIG. 4 is a diagram showing the waveforms of the functions provided in accordance with a preferred embodiment of the present invention.

Please refer to FIG. 4, which is a diagram showing the waveforms of the functions provided in accordance with a preferred embodiment of the present invention. As shown, by using LG Philips LCD model LP064V1 LCD with cold cathode fluorescent lamp (CCFL) backlight system to do the simulation, the comparison of power consumption and calculation time between the conventional technology and the automatic backlight control system provided in accordance with the preferred embodiment of the present invention is shown in the following table.

|  | Without the automatic backlight control system | With the automatic backlight control system | Improvement (%) |
| --- | --- | --- | --- |
| Power consumption (Watt) | 0.96985 | 0.96901 | 0.0009% |
| Calculation time (second) | 121.745 | 38.4124 | 68.45% |

As shown in this table, in compared with the simulation data of the conventional technology, the calculation time by using the automatic backlight control system provided in accordance with the present invention is significantly reduced, and the power consumption is slightly improved. Thus, the present invention has a significant improvement in compared with the conventional technology.

The simulation of power consumption in FIG. 4 is decided by the functions: $P(\beta)=A_{lin}\times\beta+C_{lin}$, $0\leq\beta\leq C_s$ and $P(\beta)=A_{sat}\times\beta+C_{sat}$, $C_s\leq\beta\leq 1$, and the conditions are $C_s=0.8234$, $A_{lin}=1.9600$, $C_{lin}=-0.2372$, $A_{sat}=6.9440$, $C_{sat}=-4.3240$.

In sum, by using the technologies provided in accordance with the automatic backlight control system provided in the present invention, because the present backlight intensity value is transmitted when the translation vector value is greater than the threshold value and the backlight intensity value of the previous frame is transmitted when the translation vector value is smaller than the threshold value, it is not necessary to calculate the backlight intensity repeatedly such that the complex calculation can be simplified (to reduce the calculation time), the problems of frame delay can be prevented, and the power consumption can be reduced. In addition, because the complex calculation is not necessary, a cheaper computing chip can be used to replace the high-end chip, such that the calculation cost can be reduced.

While the present invention has been particularly shown and described with reference to a preferred embodiment, it will be understood by those skilled in the art that various changes in form and detail may be without departing from the spirit and scope of the present invention.

What is claimed is:

1. An automatic backlight control system, utilized for receiving an image dataset to control a backlight module of a display device, and the automatic backlight control system comprising:

a storage module, storing a first backlight intensity value corresponding to a first frame data of the image dataset;

a analysis and control module, utilized for receiving an equivalent translation vector corresponding to a second frame data of the image dataset, the equivalent translation vector including a first vector component and a second vector component, the analysis and control module generating a translation vector value according to the first vector component and the second vector component, transmitting a first control signal when the translation vector value is smaller than a threshold value and transmitting a second control signal when the translation vector value is greater than the threshold value;

a frame analyzing module, electrically connected to the analysis and control module for receiving the second frame data and analyzing the second frame data to generate a second backlight intensity value when receiving the second control signal;

a selection module, electrically connected to the analysis and control module, the storage module, and the frame analyzing module, for transmitting the first backlight intensity value stored in the storage module when receiving the first control signal, and for transmitting the second backlight intensity value generated by the frame analyzing module when receiving the second control signal; and a backlight control module, electrically connected to the selection module and the backlight module, for receiving the first backlight intensity value or the second backlight intensity value and controlling the backlight module according to the received backlight intensity value.

2. The automatic backlight control system of claim 1, wherein the automatic backlight control system is electrically connected between a video analyzing device and the display device, and the video analyzing device is utilized for transmitting the image dataset.

3. The automatic backlight control system of claim 2, wherein the video analyzing device is a digital setup box, a video player, or a display card.

4. The automatic backlight control system of claim 2, wherein the analysis and control module comprises:

a translation vector processing unit, electrically connected to the video analyzing device and being set with the threshold value, the translation vector processing unit being utilized for receiving the equivalent translation vector to generate the translation vector value according to the first vector component and the second vector component, transmitting a first selection signal when the translation vector value is smaller than the threshold value, and transmitting a second selection signal when the translation vector value is greater than the threshold value; and a control unit, electrically connected to the translation vector processing unit, for transmitting the first control signal when receiving the first selection signal, and for transmitting the second control signal when receiving the second selection signal.

5. The automatic backlight control system of claim 2, wherein the backlight control module comprises:

a frame processing unit, electrically connected to the video analyzing device, the selection module, and the display device, for processing the second frame data to generate a processed frame data according to the first backlight intensity value or the second backlight intensity value; and a backlight control unit, electrically connected to the selection module and the display device, for transmitting a backlight control signal representing the first backlight intensity value or the second backlight intensity value to have the display device displaying the processed frame data according to the first backlight intensity value or the second backlight intensity value.

6. The automatic backlight control system of claim 1, wherein the selection module transmits the second backlight intensity value to the storage module to replace the first backlight intensity value when receiving the second control signal.

7. The automatic backlight control system of claim 1, wherein the analysis and control module generates the translation vector value by calculating a sum of absolute values of the first vector component and the second vector component.

8. The automatic backlight control system of claim 1, wherein the analysis and control module generates the translation vector value by calculating a square root of a sum of squares of the first vector component and the second vector component.

9. An automatic backlight control method, applied to the automatic backlight control system of claim 1, for receiving an image dataset to control a backlight module of a display device, and the automatic backlight control method comprising the steps of:

(a) receiving the image dataset and storing a first backlight intensity value corresponding to a first frame data of the image dataset by using the storage module;

(b) receiving, by using the analysis and control module, an equivalent translation vector corresponding to a second frame data of the image dataset, and the equivalent translation vector including a first vector component and a second vector component;

(c) generating, by the analysis and control module, a translation vector value according to the first vector component and the second vector component;

(d) determining, by the analysis and control module, whether the translation vector value is smaller than a threshold value or not;

(e) if the determination of step (d) is yes, transmitting, by the selection module, the first backlight intensity value stored in the storage module;

(f) following step (e), receiving, by using the backlight control module, the first backlight intensity value to control the backlight module accordingly;

(g) if the determination of step (d) is no, receiving and analyzing, by using the frame analyzing module, the second frame data to generate a second backlight intensity value of the second frame data;

(h) following step (g), transmitting, by the selection module, the second backlight intensity value to the backlight control module to have the backlight control module control the backlight module according to the second backlight intensity value.

10. The automatic backlight control method of claim 9, wherein the step (h) further comprises transmitting, by the selection module, the second backlight intensity value to the storage module to replace the first backlight intensity value stored in the storage module.

* * * * *